United States Patent
Visser

[15] 3,674,647
[45] July 4, 1972

[54] PREPARATION OF LINCOMYCIN ANALOGUES
[72] Inventor: Jeronimo Visser, Portage, Mich.
[73] Assignee: The Upjohn Company, Kalamazoo, Mich.
[22] Filed: Oct. 7, 1970
[21] Appl. No.: 78,935

Related U.S. Application Data
[63] Continuation-in-part of Ser. No. 68,002, Aug. 28, 1970, abandoned.

[52] U.S. Cl. .........................................195/80 R, 260/210 R
[51] Int. Cl. ..........................................................C12d 9/00
[58] Field of Search ..............................195/80 R; 260/210 R

[56] References Cited

UNITED STATES PATENTS 3,086,912   4/1963   Bergy et al. ...................... 195/80 R X

OTHER PUBLICATIONS

Magerlein et al., " Lincomycin. V Amino Acid Fragment," J.A.C.S., 89:10, May 10, 1967, pp. 2459–2464.

Primary Examiner—Joseph M. Golian
Attorney—Roman Saliwanchik and John Kekich

[57] ABSTRACT

Microbiological processes for preparing lincomycin analogues selected from the group consisting of 4'(S)-lincomycin, 4'-depropyl-4'-alkylidenelincomycin, 4'-depropyl-4'-alkyllincomycin, 1'-demethyl-4'(S)-lincomycin, 1'-demethyl-4'-depropyl-4'-alkylidenelincomycin and 1'-demethyl-4'-depropyl-4'-alkyllincomycin. These compounds have antibacterial properties and, accordingly, can be used in various environments to control the growth of susceptible micro-organisms.

9 Claims, No Drawings

PREPARATION OF LINCOMYCIN ANALOGUES

CROSS-REFERENCE TO RELATED APPLICATIONS

The subject application is a continuation-in-part of pending application Ser. No. 68,002, filed on Aug. 28, 1970 and now abandoned.

BRIEF SUMMARY OF THE INVENTION

Lincomycin is a useful antibiotic produced by a fermentation process using the micro-organism *Streptomyces lincolnensis* var. *lincolnensis*. In U.S. Pat. No. 3,086,912 there is described a fermentation and recovery process for the production of lincomycin, formerly known as lincolnensin.

The process of the subject invention comprises adding 4-substituted prolines and 4-substituted prolines plus methylthiolincosaminide (MTL), or ethylthiolincosaminide (ETL), or 7-chloro-MTL, or 7-bromo-MTL, or 7-chloro-ETL, or 7-bromo-ETL to a lincomycin fermentation as described in Example 1 of U.S. Pat. No. 3,086,912 to prepare lincomycin analogues. For example, upon the addition of 4(S)-propylproline to a lincomycin fermentation there is obtained 4'(S)-lincomycin; the addition of 4-propylideneproline results in the production of 4'-depropyl-4'-propylidenelincomycin; the addition of 4-pentylproline gives the corresponding 4'-depropyl-4'-pentyllincomycin; the simultaneous addition to the lincomycin fermentation of 4(S)-propylproline and MTL results in the production of 1'-demethyl-4'(S)-lincomycin; 4-propylideneproline and MTL gives 1'-demethyl-4'-depropyl-4'-propylidenelincomycin; and 4-pentylproline and MTL results in the production of the corresponding 1'-demethyl-4'-depropyl-4'-N-pentyllincomycin. Thus, the subject invention comprises the addition of an effective amount of 4-alkyl or 4-alkylidene proline derivatives wherein said alkyl and alkylidene are at least three carbon atoms up to eight carbon atoms, inclusive, with or without the simultaneous addition of MTL, or ETL, or 7-chloro-MTL, or 7-bromo-MTL, or 7-chloro-ETL, or 7-bromo-ETL in order to obtain biologically active lincomycin compounds.

DETAILED DESCRIPTION

Lincomycin compounds of the subject invention are prepared by adding various precursor compounds to a fermentation medium such as disclosed in Example 1 of U.S. Pat. No. 3,086,912. The compounds can be added to the fermentation, conveniently, at any time after inoculation, or at intervals during the course of the fermentation. In any event, it is desirable to add the compounds to the fermentation beer before significant antibiotic production is detected in the fermentation beer.

The lincomycin fermentation of the subject invention can be conducted with variants and/or mutants of the culture deposited and given the repository designation NRRL 2936. This culture also has the deposit designation NCIB 9413, given by the well known culture repository in Scotland.

Upon adding 4(S)-propylproline to a lincomycin fermentation there is obtained 4'(S)-lincomycin; the addition of 4-propylideneproline results in the production of 4'-depropyl-4'-propylidenelincomycin; the addition of 4-pentylproline gives the corresponding 4'-depropyl-4'-pentyllincomycin; the simultaneous addition to the lincomycin fermentation of 4(S)-propylproline and MTL results in the production of 1'-demethyl-4'(S)-lincomycin; 4-propylideneproline and MTL gives 1'-demethyl-4'-depropyl-4'-propylidenelincomycin; and 4-pentylproline and MTL results in the production of 1'-demethyl-4'-depropyl-4'-pentyllincomycin. These antibiotics are produced in addition to the normal fermentation products, for example lincomycin and lincomycin B, although the amounts of the normal products may be modified.

The effective amount of the compounds which can be added to the lincomycin fermentation to produce the novel compounds of the invention can be varied from about 0.2 g./l. to about 4 g./l.

The starting materials of the invention can be prepared by the following processes:

| | |
|---|---|
| MTL | U.S. Pat. No. 3,179,565 |
| ETL | U.S. Pat. No. 3,361,628 |
| 4(S)-propylproline | J.A.C.S. 89:10 May 10, 1967 pages 2459–2464 |
| 4-alkylideneprolines | J.A.C.S. 89:10 May 10, 1967 pages 2459–2464 |
| 4-alkylprolines | Can be prepared by obvious substitution of starting material in the process disclosed in U.S. Pat. No. 3,297,716 for the preparation of propylproline, with resolution of the resultant steroisomers by methods known in the art. |
| 7-chloro-MTL and 7-bromo-MTL | U.S. Pat. No. 3,502,648 |
| 7-chloro-ETL and 7-bromo-ETL | U.S. Pat. No. 3,502,648 |

The product lincomycin compounds can be extracted from the fermentation according to the principles already known in the art, for instance as given in U.S. Pat. Nos. 3,086,912, 3,359,163, 3,359,164, and 3,361,739, which include beer filtrations, solvent extraction, chromatographic or countercurrent distribution separation of the antibiotics, and recrystallization. A preferred procedure for the separation of the antibiotics is ion exclusive chromatography. The extracted crude antibiotics, usually as mixtures, are placed on a Dowex (Dow Chemical Company, Midland, Michigan), for example Dowex 1 × 2 (about 400 mesh) column in OH form, and the column is developed with water. The eluate is monitered by recording polarimetry, and the individual antibiotics are harvested on the basis of the appearances of optical activity.

The lincomycin compounds of the invention are bases. The acid-addition salts disclosed in U.S. Pat. No. 3,086,912 for lincomycin can be made with the compounds of the subject invention by the process disclosed in U.S. Pat. No. 3,086,912.

The compounds of the subject invention possess biological activity which in some instances is superior to that shown by lincomycin. For example, 4'-depropyl-4'-pentyllincomycin is 3.4 times as active as lincomycin in in vitro tests and about 1.4 times as active as lincomycin in an in vivo (mouse, oral, *Staphylococcus aureus*) test. Also, 1'-demethyl-4'-depropyl-4'-pentyllincomycin is about four times as active as lincomycin in in vitro tests. Reference Magerlein, Barney J. et al. Antimicrobial Agents and Chemotherapy (1966) page 727 ff. Thus, the compounds of the invention, as the free bases or acid-addition salts thereof, can be used for the same purposes as the well-known antibiotic lincomycin.

The following examples are illustrative of the processes of the subject invention, but are not to be construed as limiting. All percentages are by weight and solvents by volume unless otherwise noted.

EXAMPLE 1

A soil slant of *Streptomyces lincolnensis* var. *lincolnensis*, NRRL 2936 is used to inoculate a series of 500 ml. Erlenmeyer flasks each containing 100 ml. of seed medium consisting of the following ingredients:

| | |
|---|---|
| Yeastolac* | 10 gms. |
| Glucose monohydrate | 10 gms. |
| NZ-Amine B* | 5 gms. |
| Tap water, q.s. | 1 l. |

*Yeastolac is a protein hydrolysate of yeast cells, and NZ-Amine B is Sheffield's enzymatic digest of casein.

The seed medium presterilization pH is 7.3. The seed is grown for 2 days at 28° C. on a Gump rotary shaker operating at 250 r.p.m.

A 5 percent inoculum of the seed described above (5 ml.) is added to each of thirty 500 ml. Erlenmeyer flasks each containing 100 ml. of the following fermentation medium:

| | |
|---|---|
| Glucose monohydrate | 20 gms. |
| Molasses | 20 gms. |

| Corn steep liquor | 20 gms. |
| --- | --- |
| Wilson's peptone liquor No. 159* | 10 gms. |
| Calcium carbonate | 4 gms. |
| Tap water, q.s./1 l. | |

*Wilson's peptone liquor No. 159 is a preparation of enzymatically hydrolyzed proteins from animal origin.

The pH of the medium after sterilization is 7.0. 4-Pentyl proline is added to the flasks to a final concentration of 0.8 g./l. The flasks are incubated for 7 days at 28° C. on a Gump rotary shaker operating at 250 r.p.m.

EXTRACTION PROCEDURE

Fermentation beer from the flasks is centrifuged. Fifteen ml. of centrifuged beer is pipetted into a 125 ml. glass-stoppered flask, and 30 ml. of n-butanol is added. Ten grams of solid $K_2CO_3$ anhydrous is then added, the flask is quickly stoppered and cooled with shaking in cold water until the $K_2CO_3$ is dissolved. The mixture is then shaken on a wrist shaker for 20 minutes and then centrifuged in a 50 ml. glass centrifuge tube. An aliquot of solvent extract is removed, dried over anhydrous $Na_2SO_4$, and evaporated to dryness. It is then silylated for vapor phase chromatography according to the procedure disclosed by Houtman et al., J. Pharm. Sciences 57 (4), 693 (1963). This vapor phase chromatography, combined with mass spectroscopy, identifies the presence of 4'-depropyl-4'-pentyllincomycin having the following formula:

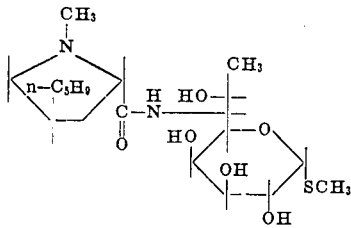

EXAMPLE 2

A flask fermentation, as described in Example 1, receives the following additions instead of the 4-pentylproline used in Example 1: 4-pentylproline (0.8 g./l.), and MTL (2.0 g./l.). At harvest, the fermentation beer is extracted as disclosed in Example 1 and subjected to vapor phase chromatography, also as disclosed in Example 1. Silylation and vapor phase chromatography, combined with mass spectroscopy, identifies the presence of the compound 1'-demethyl-4'-depropyl-4'-pentyllincomycin, having the following structural formula:

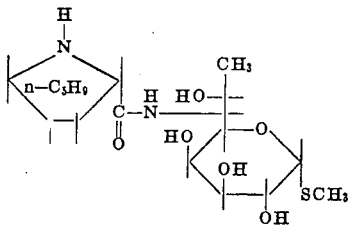

In addition to the above-noted compound, lincomycin B, lincomycin, 1'-demthyllincomycin and 4'-depropyl-4'-pentyllincomycin are identified as being present in harvest beer.

EXAMPLE 3

A lincomycin fermentation, as described in Example 1, receives a solution of 4-propylideneproline to a final concentration of 1 g./l. instead of the 4-pentylproline used in Example 1. At harvest, the fermentation beer is extracted and subjected to silylation and vapor phase chromatography as described in Example 1. These tests, with mass spectroscopy, identify the compound as 4'-depropyl-4'-propylidenelinocomycin having the following structural formula:

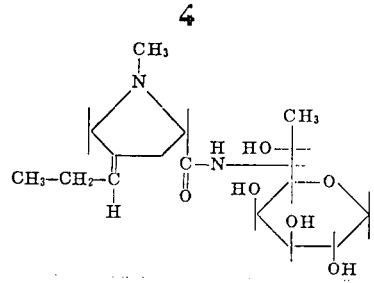

EXAMPLE 4

To a lincomycin fermentation as disclosed in Example 1, there is added a solution of 4(S)-propylproline to a concentration of 1 g./l. instead of the 4-pentylproline used in Example 1. At harvest, the fermentation beer is extracted as disclosed in Example 1. The extract is then subjected to ion-exclusion chromatography using the following procedure: The extracted lincomycins are dissolved in 1 ml. of distilled water and introduced on a column of 150 ml. Dowex 1 × 2 (400 mesh) in the OH form. (Column size 1.22 × 47 cm.) The column is developed with distilled water at 2 ml./min. for 2 hours. The eluate in 10 ml. quantities is monitored by a recording polarimeter. The two peaks obtained are identified as 4(S)-lincomycin and 4(R)-lincomycin in this sequence of elution. This chromatographic test, corroborated by analytical test procedures as disclosed above, discloses the presence of 4'(S)-lincomycin as well as 4'(R)-lincomycin. The latter compound is the natural 4'-trans form of lincomycin.

EXAMPLE 5

To a lincomycin fermentation, as disclosed in Example 1, there is added 4(S)-propylproline (1 g./l.) and MTL (2.0 g./l.) instead of the 4-pentylproline. At harvest, the fermentation beer is extracted and the extract subjected to silylation and vapor phase chromatography, as disclosed in Example 1. This chromatographic procedure disclosed the presence of 1'-demethyl-4'(S)-lincomycin, 1'-demethyl-4'(R)-lincomycin, lincomycin B and lincomycin.

EXAMPLE 6

By substituting 4-hexylproline, 4-heptylproline, and 4-octylproline in Example 1 for 4-pentylproline, there is obtained 4'-depropyl-4'-hexyllincomycin, 4'-depropyl-4'-heptyl-lincomycin, and 4'-depropyl-4'-octyllincomycin, respectively.

EXAMPLE 7

Upon substituting 4-hexylproline, 4-heptylproline, and 4-octylproline in Example 2 for 4-pentylproline, there is obtained 1'-demethyl-4'-depropyl-4'-hexyllincomycin, 1'-demethyl-4'-depropyl-4'-heptyllincomycin, and 1'-demethyl-4'-depropyl-4'-octyllincomycin, respectively.

EXAMPLE 8

Upon substituting 4-pentylideneproline, 4-hexylideneproline, 4-heptylideneproline, and 4-octylideneproline in Example 3 for 4-propylideneproline, there is obtained 4'-depropyl-4'-pentylidenelincomycin, 4'-depropyl-4'-hexylidene-lincomycin, 4'-depropyl-4'-heptylidenelincomycin, and 4'-depropyl-4'-octylidenelincomycin, respectively.

Alkyl of three to eight carbon atoms is propyl, butyl, pentyl, hexyl, heptyl, octyl, and isomeric forms thereof.

Alkylidene of three to eight carbon atoms is propylidene, butylidene, pentylidene, hexylidene, heptylidene, octylidene, and isomeric forms thereof.

I claim:

1. A microbiological process for preparing lincomycin compounds selected from the group consisting of 4'(S)-lincomycin, 4'-depropyl-4'-alkylidenelincomycin, and 4'-depropyl-4'-alkyllincomycin which comprises adding to a lincomycin fermentation, using the micro-organism *Streptomyces lincolnensis* var. *lincolnensis*, an effective amount to produce said lincomycin compounds of a compound selected from the group consisting of 4(S)-alkylproline and 4-alkylideneproline derivatives, wherein said alkyl and alkylidene each are from three to eight carbon atoms, inclusive.

2. A microbiological process for preparing lincomycin analogues selected from the group consisting of 1'-demethyl-4'-lincomycin, 1'-demethyl-4'-depropyl-4'-alkylidenelincomycin, and 1'-demethyl-4'-depropyl-4'-alkyllincomycin which comprises adding to a lincomycin fermentation, using the micro-organism *Streptomyces lincolnensis* var. *lincolnensis*, an effective amount to produce said lincomycin analogues of a compound selected from the group consisting of 4(S)-alkylproline and 4-alkylideneproline, wherein said alkyl and alkylidene are from three to eight carbon atoms, inclusive, in combination with methylthiolincosaminide, or ethylthiolincosaminide, or 7-chloro-methylthiolincosaminide, or 7-chloro-ethylthiolincosaminide, or 7-bromo-methylthiolincosaminide, or 7-bromo-ethylthiolincosaminide.

3. A process, according to claim 1, wherein the effective amount of compound added is in the range of about 0.2 g./l. to about 4 g./l.

4. A process, according to claim 2, wherein the effective amount of compound added is in the range of about 0.2 g./l. to about 4 g./l.

5. A process, according to claim 1, which comprises adding 4-pentylproline to a lincomycin fermentation to produce 4'-depropyl-4'-pentyllincomycin.

6. A process, according to claim 2, which comprises adding 4-pentylproline and methylthiolincosaminide to a lincomycin fermentation to produce 1'-demethyl-4'-depropyl-4'-pentyllincomycin.

7. A process, according to claim 1, which comprises adding 4-propylideneproline to a lincomycin fermentation to produce 4'-depropyl-'-propylidenelincomycin.

8. A process, according to claim 1, which comprises adding 4(S)-propylproline to a lincomycin fermentation to produce 4'(S)-lincomycin.

9. A process, according to claim 2, which comprises adding 4(S)-propylproline and methylthiolincosaminide to a lincomycin fermentation to produce 1'-demethyl-4'(S)-lincomycin.

* * * * *

UNITED STATES PATENT OFFICE
CERTIFICATE OF CORRECTION

Patent No. 3,674,647                    Dated July 4, 1972

Inventor(s) Jeronimo Visser

It is certified that error appears in the above-identified patent and that said Letters Patent are hereby corrected as shown below:

Column 1, line 54, for "NC1B" read -- NCIB --. Column 2, line 26, for "exclusive" read -- exclusion --. Column 5, lines 2 and 3, for "4'-lincomycin" read -- 4'(S)-lincomycin --. Column 6, line 11, for "4'-depropyl-'-" read -- 4'-depropyl-4'- --.

Signed and sealed this 9th day of January 1973.

(SEAL)
Attest:

EDWARD M. FLETCHER, JR.          ROBERT GOTTSCHALK
Attesting Officer                Commissioner of Patents